US012469466B2

(12) United States Patent
Mazrouei et al.

(10) Patent No.: US 12,469,466 B2
(45) Date of Patent: Nov. 11, 2025

(54) CIRCUIT APPARATUS AND DISPLAY SYSTEM

(71) Applicant: SEIKO EPSON CORPORATION, Tokyo (JP)

(72) Inventors: Sebdani Mahmood Mazrouei, Markham (CA); Kwok lap Jimmy Lai, Vancouver (CA); Kumar Anandabairavasamy Anand, Richmond (CA)

(73) Assignee: SEIKO EPSON CORPORATION (JP)

( * ) Notice: Subject to any disclaimer, the term of this patent is extended or adjusted under 35 U.S.C. 154(b) by 4 days.

(21) Appl. No.: 18/618,071

(22) Filed: Mar. 27, 2024

(65) Prior Publication Data

US 2024/0331647 A1 Oct. 3, 2024

(30) Foreign Application Priority Data

Mar. 28, 2023 (JP) ................................ 2023-051046

(51) Int. Cl.
*G09G 3/34* (2006.01)

(52) U.S. Cl.
CPC ....... *G09G 3/3426* (2013.01); *G09G 2320/02* (2013.01); *G09G 2320/0242* (2013.01); *G09G 2320/0626* (2013.01); *G09G 2340/04* (2013.01); *G09G 2360/16* (2013.01)

(58) Field of Classification Search
None
See application file for complete search history.

(56) References Cited

U.S. PATENT DOCUMENTS

2012/0281028 A1* 11/2012 Orlick ................. G09G 3/3426
345/102

FOREIGN PATENT DOCUMENTS

JP 2021-009170 A 1/2021

* cited by examiner

*Primary Examiner* — Parul H Gupta
(74) *Attorney, Agent, or Firm* — Harness, Dickey & Pierce, P.L.C.

(57) ABSTRACT

A circuit apparatus controls a display apparatus including a plurality of light source elements and a display panel. The circuit apparatus includes a resolution reduction circuit and a light source luminance determination circuit. The resolution reduction circuit generates, from input image data, low-resolution image data having a lower resolution than the input image data. The light source luminance determination circuit receives the low-resolution image data. The light source luminance determination circuit determines, by light adjustment processing based on the low-resolution image data, light source luminance information indicating luminance of light emitted by each light source element of the plurality of light source elements.

9 Claims, 13 Drawing Sheets

FIG. 3

| y \ x | 1 | 2 | 3 | 4 | 5 | 6 | 7 | 8 |
|---|---|---|---|---|---|---|---|---|
| 1 | 224 | 64 | 0 | 64 | 224 | 32 | 192 | 64 |
| 2 | 32 | 128 | 64 | 192 | 128 | 0 | 64 | 224 |
| 3 | 0 | 64 | 224 | 0 | 64 | 224 | 224 | 64 |
| 4 | 64 | 224 | 64 | 128 | 128 | 0 | 32 | 128 |
| 5 | 0 | 64 | 224 | 32 | 192 | 64 | 0 | 64 |
| 6 | 64 | 192 | 64 | 0 | 64 | 224 | 64 | 224 |

| y \ x | 1 | 2 | 3 | 4 |
|---|---|---|---|---|
| 1 | 112 | 80 | 96 | 136 |
| 2 | 88 | 104 | 104 | 112 |
| 3 | 80 | 80 | 136 | 88 |

FIG. 5

LUT1

| INDEX | $(DISTANCE)^2$ |
|---|---|
| 0 | 0 |
| 1 | 100 |
| 2 | 400 |
| 3 | 900 |
| 4 | 1600 |
| 5 | 2500 |
| 6 | 3600 |
| 7 | 4900 |
| 8 | 6400 |
| 9 | 8100 |
| 10 | 10000 |

LUT2

| INDEX | ATTENUATION FACTOR |
|---|---|
| 0 | 100.0 |
| 1 | 93.9 |
| 2 | 77.9 |
| 3 | 57.0 |
| 4 | 36.8 |
| 5 | 21.0 |
| 6 | 10.5 |
| 7 | 4.7 |
| 8 | 1.8 |
| 9 | 0.6 |
| 10 | 0.2 |

CIRCUIT APPARATUS AND DISPLAY SYSTEM

The present application is based on, and claims priority from JP Application Serial Number 2023-051046, filed Mar. 28, 2023, the disclosure of which is hereby incorporated by reference herein in its entirety.

BACKGROUND

1. Technical Field

The present disclosure relates to a circuit apparatus, a display system, and the like.

2. Related Art

JP-A-2021-009170 discloses a display apparatus including a backlight divided into a plurality of control areas whose light emission intensities can be changed independently of each other, and a backlight control unit that controls lighting of the backlight for each control area. The backlight control unit determines a light emission intensity of a light source for each control area based on a tone value of each pixel of input image data.

JP-A-2021-009170 is an example of the related art.

SUMMARY

In JP-A-2021-009170, since the light emission intensity of the light source is determined based on the tone value of each pixel of the input image data, there is a problem that a load of calculation for determining the light emission intensity of the light source is heavy. For example, in recent years, due to an increase in a resolution of a display panel, a resolution of the input image data increases, and the load of the calculation for determining the light emission intensity of the light source using the input image data increases.

An aspect of the disclosure relates to a circuit apparatus that controls a display apparatus including a plurality of light source elements and a display panel, the circuit apparatus including: a resolution reduction circuit configured to generate, from input image data, low-resolution image data having a lower resolution than the input image data; and a light source luminance determination circuit configured to receive the low-resolution image data and determine, by light adjustment processing based on the low-resolution image data, light source luminance information indicating luminance of light emitted by each light source element of the plurality of light source elements.

Another aspect of the disclosure relates to a display system including the circuit apparatus and the display apparatus.

BRIEF DESCRIPTION OF THE DRAWINGS

FIG. 3 shows a first example of resolution reduction processing.

FIG. 5 is an example of a look-up table.

DESCRIPTION OF EMBODIMENTS

Hereinafter, a preferred embodiment of the disclosure will be described in detail. The embodiment described below does not unduly limit the contents of the claims, and not all of the configurations described in the embodiment are essential configuration requirements.

1. Electronic Device, Display System, and Circuit Apparatus

Figure 1:
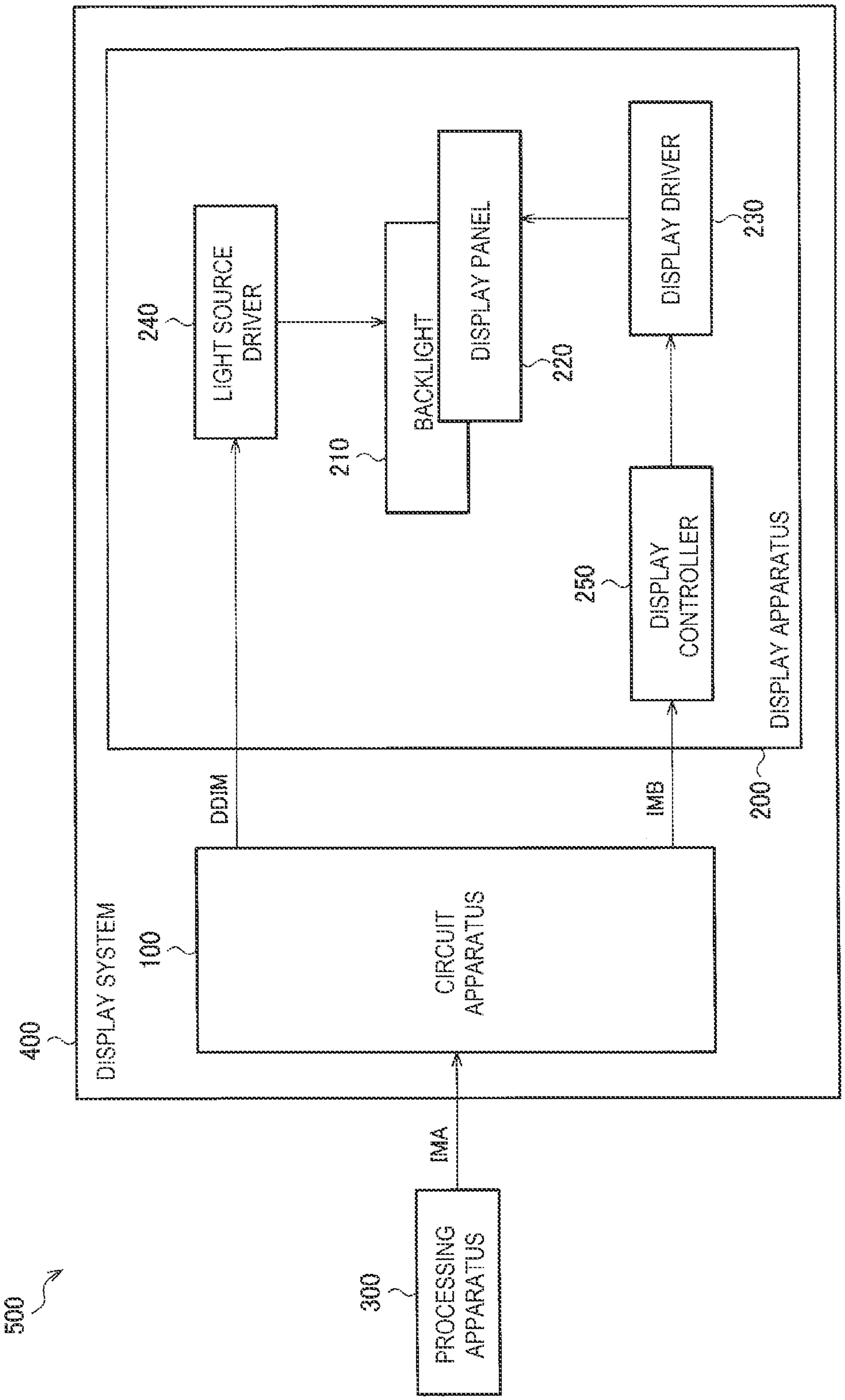
FIG. 1 is a configuration example of an electronic device.

FIG. 1 is a configuration example of an electronic device including a display system according to the embodiment. An electronic device 500 includes a processing apparatus 300 and a display system 400. The electronic device 500 is, for example, an in-vehicle display device including a meter panel, a center information display, a head-up display, or an electronic mirror, a television apparatus, or an information processing apparatus including a display.

The display system 400 includes a circuit apparatus 100 and a display apparatus 200. The circuit apparatus 100 is, for example, an integrated circuit apparatus in which a plurality of circuit elements are integrated on a semiconductor substrate. The circuit apparatus 100 and the display apparatus 200 are shown as separate components in FIG. 1, and alternatively, the circuit apparatus 100 may be provided in the display apparatus 200.

The display apparatus 200 includes a backlight 210, a display panel 220, a display driver 230, a light source driver 240, and a display controller 250. An example of the display apparatus 200 is a display used in a television apparatus, an information processing apparatus, or the like. Alternatively, the display apparatus 200 may be a head-mounted display including a projection apparatus for eyes, a head-up display including a projection apparatus for a screen, or the like. When the display apparatus 200 is a head-up display, the display apparatus 200 further includes an optical system for projecting light, which is emitted from the backlight 210 and transmitted through the display panel 220, onto a screen.

In a plan view of the backlight 210, light source elements are two-dimensionally disposed in the backlight 210. Each light source element is a light-emitting element that emits light by electric power supply, and is, for example, an inorganic light-emitting diode or an organic light-emitting diode. In local dimming control, a light quantity of each of the light source elements disposed two-dimensionally is independently controlled. Alternatively, the backlight 210 may be divided into a plurality of areas. In a plan view, a plurality of light source elements are disposed in each area. The light source elements disposed in the area are controlled to have the same light quantity, and a light quantity of each area is independently controlled.

An example of a two-dimensional disposition of the light source elements is a square disposition in which the light source elements are disposed at all intersections of a plurality of rows and a plurality of columns. However, the two-dimensional disposition is not limited to the square disposition. For example, the two-dimensional disposition may be a disposition called a rhombus disposition or a zigzag disposition. In such a disposition, the light source elements are disposed at intersections of one of an odd row and an even row with an odd column, and intersections of the other of the odd row and the even row with an even column, and no light source element is disposed at other intersections.

The light source driver 240 receives light source luminance data DDIM from the circuit apparatus 100, and drives each light source element of the backlight 210 based on the light source luminance data DDIM. The light source driver 240 is, for example, an integrated circuit apparatus. A plurality of light source drivers may be provided, and each of the light source drivers may be a separate integrated circuit apparatus.

The display panel 220 is an electro-optical panel that transmits light from the backlight 210 and displays an image by controlling a transmittance thereof. For example, the display panel 220 is a liquid crystal display panel.

The display controller 250 receives image data IMB from the circuit apparatus 100, and transmits the image data IMB and a timing control signal for controlling a display timing to the display driver 230. The display controller 250 may perform image processing such as tone correction, white balance correction, or enlargement and reduction on the received image data IMB.

The display driver 230 displays an image on the display panel 220 by driving the display panel based on the received image data and the timing control signal. The display controller 250 and the display driver 230 may be implemented by separate integrated circuit apparatuses, or may be implemented integrally by an integrated circuit apparatus.

The processing apparatus 300 transmits image data IMA to the circuit apparatus 100. The processing apparatus 300 is a processor such as a CPU, a GPU, a microcomputer, a DSP, an ASIC, or an FPGA. The CPU is an abbreviation for a central processing unit. The GPU is an abbreviation for a graphics processing unit. The DSP is an abbreviation for a digital signal processor. The ASIC is an abbreviation for an application specific integrated circuit. The FPGA is an abbreviation for a field programmable gate array.

The circuit apparatus 100 receives the image data IMA and performs local dimming control of the display apparatus 200 based on the image data IMA. The circuit apparatus 100 adjusts light emission luminance of each light source element of the backlight 210 or each area according to luminance of the image data IMA, and outputs light source luminance information obtained by the light adjustment as the light source luminance data DDIM to the light source driver 240. The circuit apparatus 100 performs color correction on the image data IMA based on the light source luminance information and outputs the image data IMB after the color correction to the display controller 250.

Figure 2:
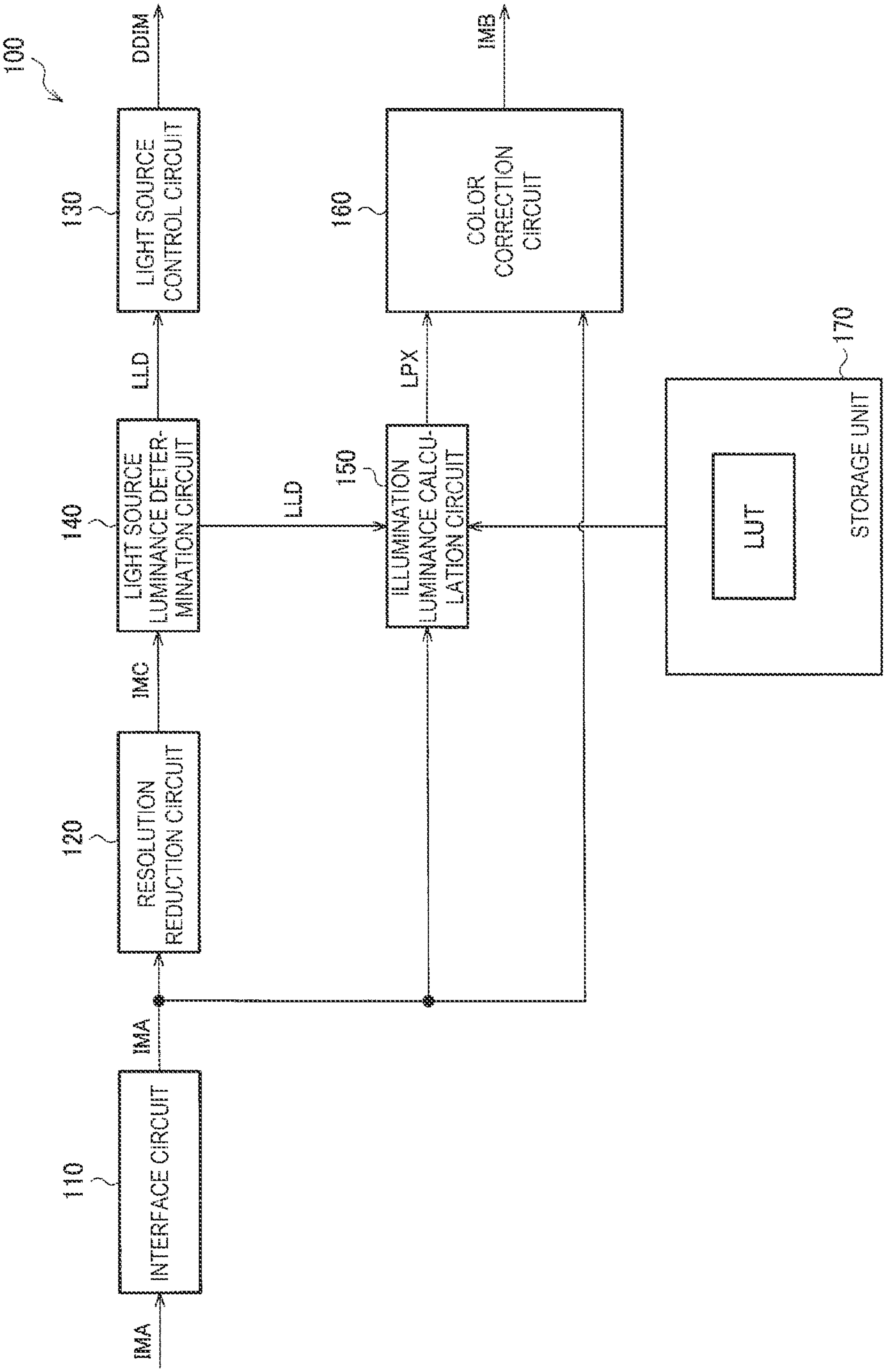
FIG. 2 is a first detailed configuration example of a circuit apparatus.

FIG. 2 is a first detailed configuration example of the circuit apparatus. The circuit apparatus 100 includes an interface circuit 110, a resolution reduction circuit 120, a light source control circuit 130, a light source luminance determination circuit 140, an illumination luminance calculation circuit 150, a color correction circuit 160, and a storage unit 170. Hereinafter, a case where light is independently adjusted for each light-emitting element of the backlight 210 in local dimming will be described as an example, and alternatively, light may be independently adjusted for each area including a plurality of light-emitting elements.

The interface circuit 110 receives the image data IMA from the processing apparatus 300. The interface circuit 110 may be an interface circuit of various image interface methods such as LVDS, a parallel RGB method, or a display port. The LVDS is an abbreviation for low voltage differential signaling.

The storage unit 170 stores, as attenuation factor distribution information, a look-up table indicating an attenuation factor distribution of light reaching the display panel from the light source element. The attenuation factor distribution indicates a relationship between a distance from the light source element to a pixel and an attenuation factor of light with which the light source element illuminates the pixel. The attenuation factor distribution is also referred to as an attenuation characteristic or a luminance distribution. The storage unit 170 is a register or a memory. The memory is a volatile memory such as a RAM or a non-volatile memory such as an OTP memory or an EEPROM. The RAM is an abbreviation for a random access memory. The OTP is an abbreviation for one time programmable. The EEPROM is an abbreviation for an electrically erasable programmable read only memory.

The image data IMA is input from the interface circuit 110 to the resolution reduction circuit 120. The image data IMA is also referred to as input image data. The resolution reduction circuit 120 performs processing of reducing a resolution of the image data IMA and generates low-resolution image data IMC having a lower resolution than the image data IMA. The term "low resolution" means that the number of pixels of image data per frame is small.

The light source luminance determination circuit 140 analyzes luminance of the low-resolution image data IMC, determines light emission luminance of each light-emitting element based on a result of the analysis, and outputs light source luminance information indicating the light emission luminance of each light-emitting element as light source luminance data LLD. Specifically, the light source luminance determination circuit 140 determines, in an image area corresponding to the light-emitting element of the backlight 210, maximum luminance of pixel data belonging to the image area. The light source luminance determination circuit 140 determines minimum light emission luminance within a range in which the maximum luminance can be displayed on the display apparatus 200, and sets the minimum light emission luminance as the light emission luminance of the light-emitting element. Alternatively, the light source luminance determination circuit 140 may determine the light emission luminance of each light source element by performing light adjustment processing using the low-resolution image data IMC and a look-up table LUT stored in the storage unit 170. Details of this method will be described later.

The light source control circuit 130 controls the light source driver 240 based on the light source luminance data LLD. Specifically, the light source control circuit 130 outputs a timing control signal for controlling a light emission timing of the light-emitting element or an update timing of the light emission luminance to the light source driver 240, and outputs the light source luminance data LLD as the light source luminance data DDIM to the light source driver 240. The light source driver 240 drives, at a timing defined by the timing control signal, each light-emitting element by a PWM signal having a pulse width corresponding to the light emission luminance of each light source element indicated by the light source luminance data DDIM. Accordingly, each light-emitting element emits light with the light emission luminance controlled by local dimming.

The illumination luminance calculation circuit 150 calculates illumination luminance information based on the light source luminance data LLD and the look-up table stored in the storage unit 170, and outputs the illumination luminance information as illumination luminance data LPX. The illumination luminance information indicates illumination luminance at a position on the display panel 220 corresponding to each pixel of the image data IMA when the display panel 220 is illuminated by the backlight 210.

The color correction circuit 160 performs color correction on the image data IMA based on the illumination luminance data LPX and outputs the corrected image data IMB to the display driver 230. Specifically, the color correction circuit 160 multiplies pixel data of each pixel by a reciprocal of luminance of light reaching the pixel and uses a result thereof as new pixel data of the pixel.

The resolution reduction circuit 120, the light source control circuit 130, the light source luminance determination circuit 140, the illumination luminance calculation circuit 150, and the color correction circuit 160 are logic circuits that process digital signals. The resolution reduction circuit 120, the light source control circuit 130, the light source luminance determination circuit 140, the illumination luminance calculation circuit 150, and the color correction circuit 160 may be implemented by separate logic circuits, or a part or all thereof may be implemented by an integrated logic circuit. Alternatively, a processor such as a DSP may execute an instruction set or a program describing functions of the resolution reduction circuit 120, the light source control circuit 130, the light source luminance determination circuit 140, the illumination luminance calculation circuit 150, and the color correction circuit 160 to implement the functions of the circuits.

Alternatively, the circuit apparatus 100 may be a processor such as a CPU, a GPU, a microcomputer, a DSP, an ASIC, or an FPGA. A function of the circuit apparatus 100 may be implemented by the processor executing an instruction set or a program describing the function of each unit of the circuit apparatus 100.

The circuit apparatus 100 may include distortion correction circuit. The distortion correction circuit corrects image distortion caused by an optical system that projects an image displayed on the display panel 220 onto a screen or the like, or image distortion caused by screen distortion. Specifically, the distortion correction circuit performs image correction for canceling or reducing the image distortion on the image data IMA received by the interface circuit 110 and outputs the corrected image data to the resolution reduction circuit 120, the illumination luminance calculation circuit 150, and the color correction circuit 160. However, the distortion correction circuit may be provided in the processing apparatus 300 instead of the circuit apparatus 100.

An example in which the attenuation factor distribution information is the look-up table is described above, and the attenuation factor distribution information may be any information indicating the attenuation factor distribution. The attenuation factor distribution information may be, for example, a function indicating the attenuation factor distribution. An argument of the function is a distance, and a return value is an attenuation factor. The storage unit 170 stores function information defining the function, and the illumination luminance calculation circuit 150 obtains an attenuation factor by inputting a distance into the function defined by the function information. The same applies to a case where the light source luminance determination circuit 140 uses the attenuation factor distribution information. The function information is, for example, a coefficient used for the function. An example in which the attenuation factor distribution information is a look-up table will be described later.

2. Resolution Reduction Circuit, Light Source Luminance Determination Circuit, and Illumination Luminance Calculation Circuit FIG. 3 shows a first example of resolution reduction processing. A left portion in FIG. 3 shows the image data IMA, and a right portion in FIG. 3 shows the low-resolution image data IMC. One quadrangle represents one pixel. A number attached to each pixel indicates a pixel value of the pixel. Here, it is assumed that a range of the pixel value is 0 to 255. A larger pixel value indicates higher luminance. An x direction is a horizontal scanning direction of an image, and a y direction is a vertical scanning direction of the image. Positions of pixels of image data in each direction are indicated by integers.

The resolution reduction circuit 120 reduces the resolution of the image data IMA to 1/(p×q). Here, 1/p represents a magnification in the x direction, and 1/q represents a magnification in the y direction. In FIG. 3, p=q=2, and each of p and q may be an integer of 2 or more. However, when interpolation processing is used, each of p and q may be a real number larger than 1.

It is assumed that each of a and b is an integer of 1 or more. The resolution reduction circuit 120 reduces 2×2 pixels at positions (2*a*-1, 2*b*-1), (2*a*, 2*b*-1), (2*a*-1, 2*b*), and (2*a*, 2*b*) in the image data IMA to one pixel at a position (a, b) in the low-resolution image data IMC.

The resolution reduction circuit 120 generates the low-resolution image data IMC by, for example, performing averaging processing on the image data IMA. FIG. 3 shows an example of the averaging processing. The averaging processing is processing of obtaining a pixel value at the position (a, b) in the low-resolution image data IMC by averaging pixel values at the positions (2*a*-1, 2*b*-1), (2*a*, 2*b*-1), (2*a*-1, 2*b*), and (2*a*, 2*b*) in the image data IMA.

Alternatively, the resolution reduction circuit 120 generates the low-resolution image data IMC by performing thinning processing on the image data IMA. The thinning processing is processing of obtaining the pixel value at the position (a, b) in the low-resolution image data IMC by extracting a pixel at a predetermined position among the positions (2*a*-1, 2*b*-1), (2*a*, 2*b*-1), (2*a*-1, 2*b*), and (2*a*, 2*b*) in the image data IMA.

Alternatively, the resolution reduction circuit 120 generates the low-resolution image data IMC by using interpolation performing reduction processing processing on the image data IMA. The reduction processing using the interpolation processing is, for example, processing of obtaining the pixel value at the position (a, b) in the low-resolution image data IMC by bilinear interpolation or bicubic interpolation from the pixel values at the positions (2*a*-1, 2*b*-1), (2*a*, 2*b*-1), (2*a*-1, 2*b*), and (2*a*, 2*b*) in the image data IMA.

Figure 4:
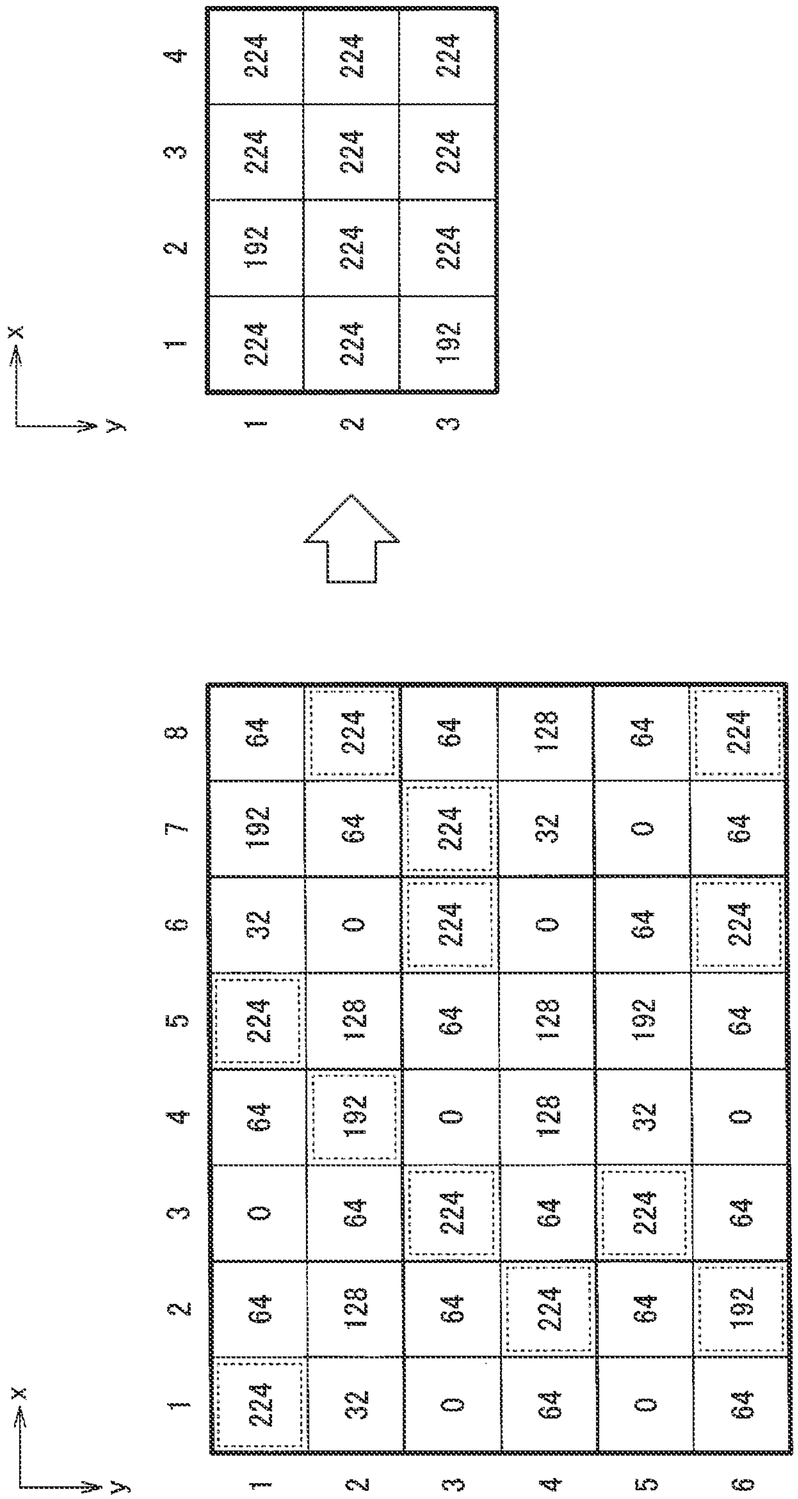
FIG. 4 shows a second example of the resolution reduction processing.

FIG. 4 shows a second example of the resolution reduction processing. A left portion in FIG. 4 shows the image data IMA, and a right portion in FIG. 4 shows the low-resolution image data IMC.

The resolution reduction circuit 120 generates the low-resolution image data IMC by extracting a pixel having a maximum pixel value for each of p×q pixels in the image data IMA. In FIG. 4, p=q=2, and each of p and q may be an integer of 2 or more. As shown in FIG. 4, the resolution reduction circuit 120 sets a maximum value of the pixel values at the positions (2*a*-1, 2*b*-1), (2*a*, 2*b*-1), (2*a*-1, 2*b*), and (2a, 2b) in the image data IMA as the pixel value at the position (a, b) in the low-resolution image data IMC. In the left portion of FIG. 4, the pixel having the maximum value is marked with a quadrangle of a dotted line.

The processing in FIGS. 3 and 4 is, for example, resolution reduction processing for a monochrome image. When the image data is a color image, for example, the resolution reduction processing is performed on image data of each color of RGB image data. Alternatively, the RGB image data may be converted into YCrCb image data or the like, the YCrCb image data or the like may be subjected to the resolution reduction processing, and then converted into the RGB image data again.

FIG. 5 is an example of a look-up table.

Light from the light source element is diffused by a diffusion sheet or the like, and the diffused light is emitted to the display panel. At this time, a luminance distribution of the light due to the diffusion is an attenuation factor distribution. Specifically, an attenuation factor distribution corresponding to characteristics of the source element and the light diffusion sheet or an attenuation factor distribution approximating such an attenuation factor distribution is converted into a table and stored in the storage unit 170 as the look-up table LUT. The processing apparatus 300 in FIG. 1 may write the look-up table LUT in the storage unit 170 or, when the storage unit 170 includes a non-volatile memory, the look-up table LUT may be stored in the non-volatile memory in advance. The look-up table LUT can be freely programmed, and may be changed according to a model of the display apparatus 200, for example.

As shown in FIG. 5, the look-up table LUT includes a look-up table LUT1 storing a square of a distance and a look-up table LUT2 storing an attenuation factor.

Each index in the look-up table LUT1 stores a square of a distance associated with the index. Here, an example in which the index is 0 to 10 is shown, but the index may be any number. In addition, an example in which the distance is marked at equal intervals in a range of 0 to 100 is shown, but the range of the distance may be any range, and intervals between marks may not be equal. The index is, for example, a memory address. Alternatively, each index in the look-up table LUT1 may store a distance associated with the index.

Each index in the look-up table LUT2 stores an attenuation factor associated with the index. The attenuation factor is represented by a value normalized with maximum luminance being 100%.

For example, when the square of the distance is 300, the illumination luminance calculation circuit 150 sequentially reads squares of distances of the respective indexes from the look-up table LUT1 and compares the squares with 300 to determine indexes 1 and 2 corresponding to 100 and 400 sandwiching 300. The illumination luminance calculation circuit 150 reads attenuation factors 93.9% and 77.9% of the indexes 1 and 2 from the look-up table LUT2 and obtains an attenuation factor corresponding to a square 300 of the distance by interpolation. The same applies to a case where the light source luminance determination circuit 140 uses the attenuation factor distribution information. However, since the low-resolution image data IMC is used, the light source luminance determination circuit 140 refers to the look-up table LUT1 by converting the distance. This point will be described later.

FIG. 5 shows a one-dimensional look-up table, and alternatively, a two-dimensional look-up table may be used. The distance is represented by an x distance and a y distance. The square of the distance is a sum of a square of the x distance and a square of the y distance. The x distance is a distance in the horizontal scanning direction of the display panel, and the y distance is a distance in the vertical scanning direction of the display panel. The look-up table LUT is a look-up table that outputs an attenuation factor corresponding to a set of the x distance and the y distance.

Figure 6:
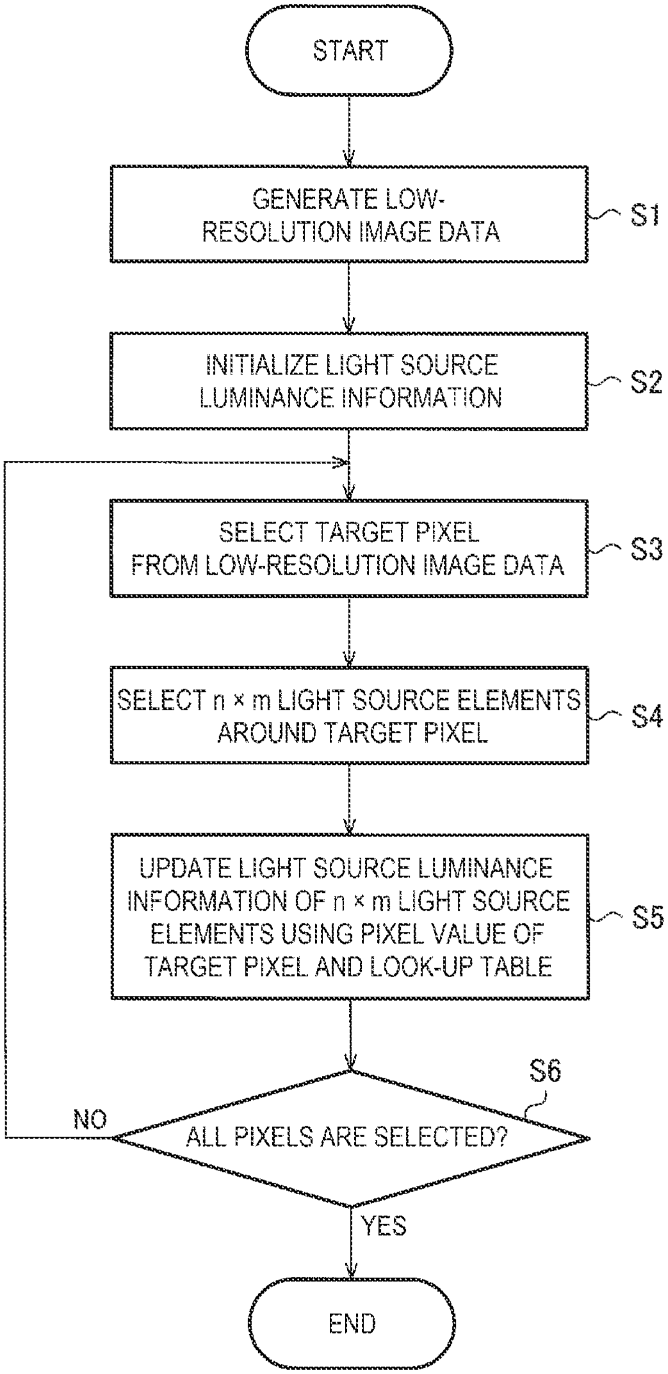
FIG. 6 is a first flow of processing performed by a resolution reduction circuit and a light source luminance determination circuit.

FIG. 6 is a first flow of processing performed by the resolution reduction circuit and the light source luminance determination circuit.

In step S1, the resolution reduction circuit 120 generates the low-resolution image data IMC by reducing the resolution of the image data IMA. A specific method is as described in FIGS. 3 and 4.

In step S2, the light source luminance determination circuit 140 initializes the light source luminance information. For example, luminance values of all light source elements are initialized to zero.

In step S3, the light source luminance determination circuit 140 selects one pixel from pixels in the low-resolution image data IMC. The selected pixel is referred to as a target pixel. In a loop from step S3 to step S6, target pixels are sequentially selected. For example, when a first pixel on a first scanning line of the low-resolution image data IMC is selected in first step S3, a second pixel, a third pixel, . . . are selected sequentially in subsequent steps S3, and when all pixels on the first scanning line are selected, pixels on a second scanning line are selected sequentially, and so on until a last scanning line.

Figure 7:
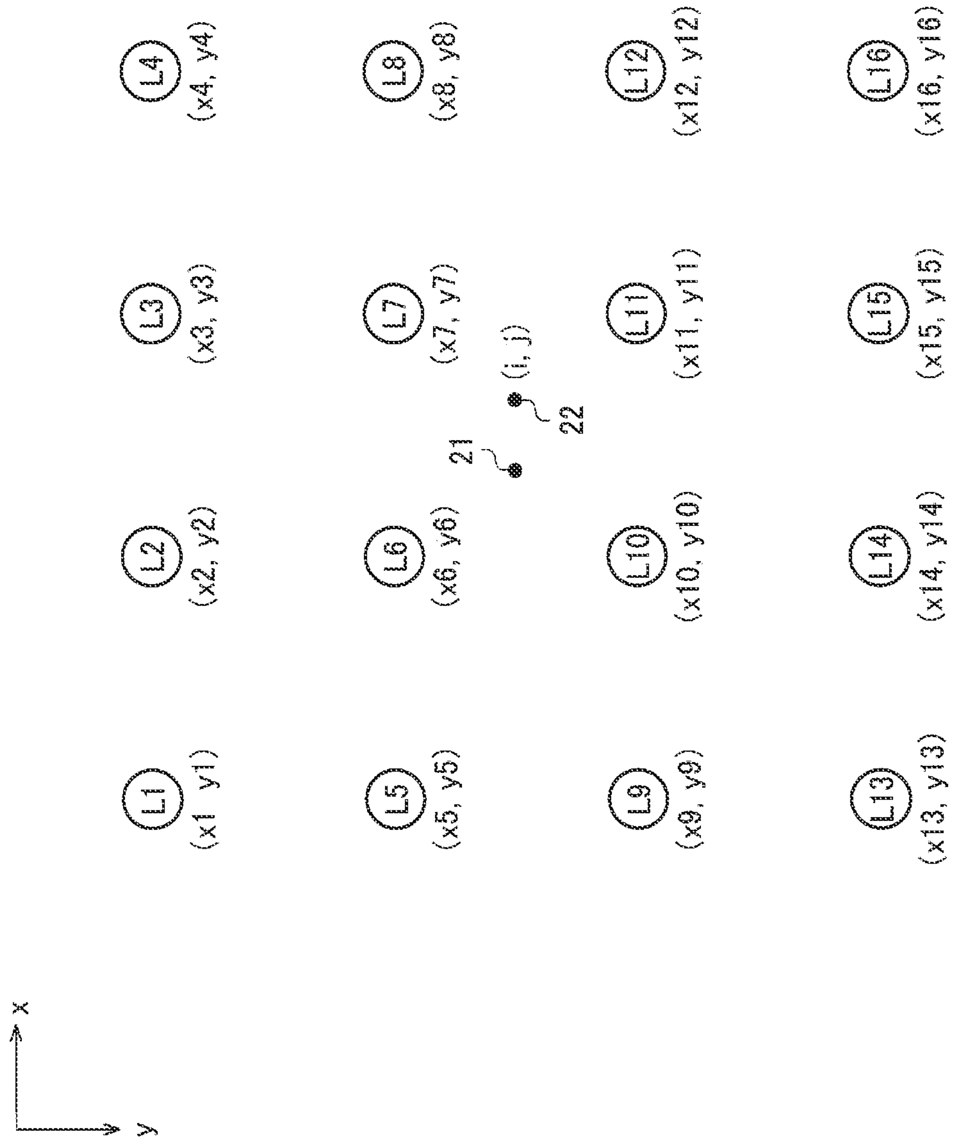
FIG. 7 is an example of surrounding light source elements.

In step S4, the light source luminance determination circuit 140 selects n×m light source elements around the target pixel. The n×m light source elements are also referred to as surrounding light source elements. FIG. 7 shows an example of surrounding light source elements. Here, an example in which n=4 and m=4 is shown, and n and m may each be an integer of 2 or more.

As shown in FIG. 7, a converted position of a target pixel 22 is (i, j). Each of i and j is an integer of 1 or more. The converted position is obtained by converting a position in the low-resolution image data IMC into a position on the display panel 220. For example, it is assumed that the resolution of the image data IMA is the same as that of the display panel 220. At this time, assuming that the position in the low-resolution image data IMC is ($i_{low}$, $j_{low}$), (i, j)=(p×$i_{low}$, q×$j_{low}$) is satisfied. When p and q are real numbers in a case where the resolution reduction processing is interpolation processing or the like, i and j may be real numbers.

The light source luminance determination circuit 140 selects light source elements L1 to L16 in nearest two columns in each of a +x direction and a −x direction and in nearest two rows in each of a +y direction and a −y direction with reference to the position (i, j). When k is an integer of 1 or more and 16 or less, a position corresponding to a light source element Lk in the display panel 220 is represented by (xk, yk).

In step S5 in FIG. 6, light source luminance information for each of the n×m light source elements selected in step S4 is updated using a pixel value of the target pixel 22 in the low-resolution image data IMC and the look-up table LUT stored in the storage unit 170.

In step S6, the light source luminance determination circuit 140 determines whether all pixels are selected as target pixels, ends the processing when all pixels are selected, and returns to step S3 when there is any unselected pixel.

Update processing of the light source luminance information in step S5 will be described using the example in FIG. 7. By the following equation (1), the light source luminance determination circuit 140 obtains a required change amount $\Delta_{ij}$ indicating a change amount required for a light quantity received by the target pixel 22 from the light source elements L1 to L16. Here, i and j of $\Delta_{ij}$ represent a position of the target pixel 22 in the low-resolution image data IMC. That is, the light source luminance determination circuit 140 obtains the required change amount $\Delta_{ij}$ by the resolution of the low-resolution image data IMC.

$$\Delta_{ij} = \mathrm{INT}_{ij} - \sum_{k=1}^{16} lsf(k) \times powc(k) \tag{1}$$

$$lsf(k) = lsf\left((i - xk)^2 + (j - yk)^2\right) \tag{2}$$

In the equation (1), $\mathrm{INT}_{ij}$ is a pixel intensity based on the pixel value of the target pixel 22 in the low-resolution image data IMC. The pixel intensity is, for example, a luminance value calculated from RGB pixel values of the target pixel 22 or a maximum value among the RGB pixel values of the target pixel 22. As shown in the equation (2), lsf(k) is an attenuation factor of light with which the light source element Lk illuminates the target pixel 22 on the display panel 220. The distance is converted into a distance on the display panel 220, that is, calculated from the converted position (i, j) of the target pixel on the display panel 220 and the position (xk, yk) of the light source element. The light source luminance determination circuit 140 obtains the attenuation factor lsf(k) using the distance and the look-up table LUT. Previous light source luminance information of the light source element Lk is represented by powc(k). The previous light source luminance information is light source luminance information calculated using a previous target pixel 21 selected one before the current target pixel 22. The previous target pixel 21 is a pixel at a converted position (i−p, j)=(p×($i_{low}$−1), q×$j_{low}$) one before the position (i, j) in the x direction.

The light source luminance determination circuit 140 distributes the required change amount $\Delta_{ij}$ to light source luminance information of the light source element Lk by the following equation (3) to update the light source luminance information.

$$powc(k) = \begin{cases} powc(k) + \Delta_{ij} \dfrac{lsf^{x}(k)}{\sum_{\alpha=1}^{16} lsf^{x+1}(\alpha)}, & \text{if } \Delta_{ij} > 0 \\ powc(k), & \text{if } \Delta_{ij} \le 0 \end{cases} \tag{3}$$

In the equation (3), powu(k) is current light source luminance information, that is, the updated light source luminance information. In a second term on a right side of the equation (3), an attenuation factor $lsf^{x}(k)=lsf(k)$, and an attenuation factor $lsf^{x+1}(k)=lsf^{2}(k)=lsf(k)\times lsf(k)$. That is, the light source luminance determination circuit 140 obtains the attenuation factor lsf(k) using the look-up table LUT and calculates the second term on the right side using the attenuation factor lsf(k). However, as will be described later, the attenuation factor $lsf^{x}(k)$ may be switched according to a mode.

Figure 8:
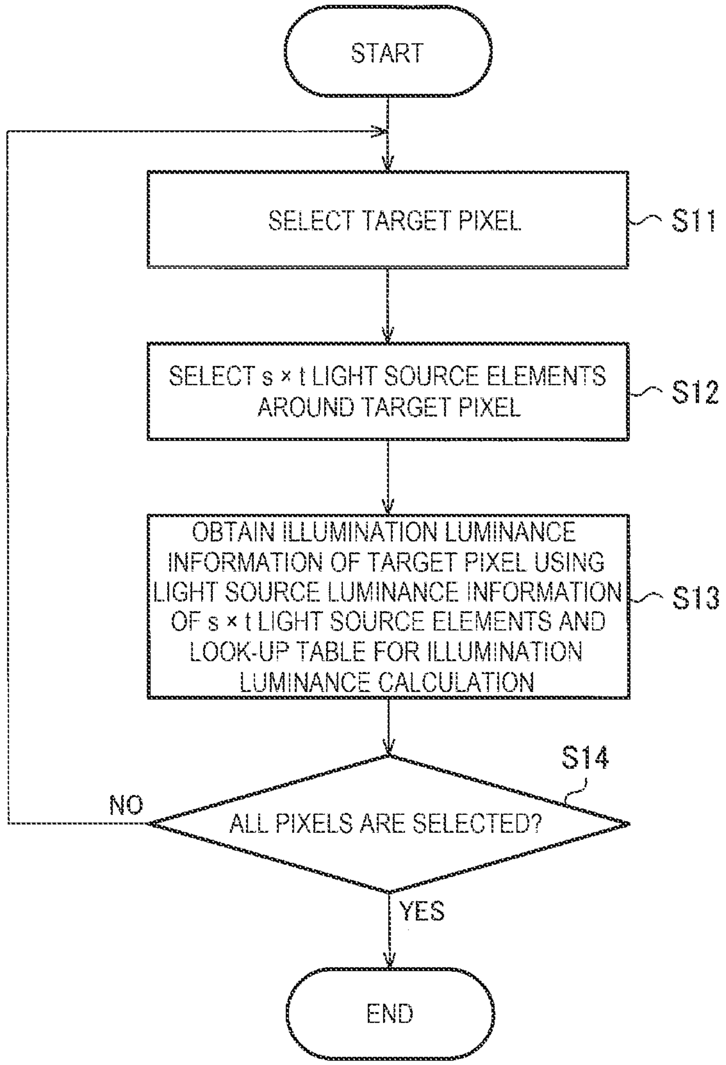
FIG. 8 is a flow of processing performed by an illumination luminance calculation circuit.

FIG. 8 is a flow of processing performed by the illumination luminance calculation circuit.

In step S11, the illumination luminance calculation circuit 150 selects one pixel from the pixels in the image data IMA. The selected pixel is referred to as a target pixel. In a loop from step S11 to step S14, target pixels are sequentially selected. For example, when the first pixel on the first scanning line of the image data IMA is selected in first step S11, the second pixel, the third pixel, . . . are selected sequentially in subsequent steps S11, and when all pixels on the first scanning line are selected, the pixels on the second scanning line are selected sequentially, and so on until the last scanning line.

In step S12, the illumination luminance calculation circuit 150 selects s×t light source elements around the target pixel. Each of s and t may be an integer of 2 or more. Here, s×t may be the same number as or a number different from n×m. The illumination luminance information may be obtained from all light source elements instead of the s×t light source elements.

In step S13, the illumination luminance calculation circuit 150 obtains the illumination luminance information of the target pixel using the light source luminance information of the selected s×t light source elements and the look-up table LUT stored in the storage unit 170. Specifically, the illumination luminance calculation circuit 150 obtains the illumination luminance information of the target pixel by the following equation (4).

$$PL(i, j) = \sum_{\beta=1}^{s\times t} pow(\beta) \times lsf(\beta) \tag{4}$$

In the equation (4), PL(i, j) is illumination luminance information relative to a pixel at the position (i, j). Here, the target pixel is selected from the image data IMA, and the position (i, j) indicates the position of the pixel on the display panel 220 instead of the converted position. That is, here, i and j are integers changed by one, and the illumination luminance calculation circuit 150 calculates the illumination luminance information PL(i, j) by the resolution of the image data IMA. The light source luminance information determined by the light source luminance determination circuit 140 is represented by pow(β). That is, after the loop of steps S3 to S6 in FIG. 6 is executed up to a last pixel in the low-resolution image data IMC, powu in the equation (3) is used as pow in the equation (4). Even when the loop of steps S3 to S6 is not executed up to the last pixel in the low-resolution image data IMC, update of light source luminance information of each light source element is sequentially completed as the target pixel advances, and thus the light source luminance information whose update is completed may be used as pow. Here, lsf(β) is an attenuation factor. The illumination luminance calculation circuit 150 obtains the attenuation factor lsf(β) using the look-up table LUT.

In step S14, the illumination luminance calculation circuit 150 determines whether all pixels are selected as target pixels, ends the processing when all pixels are selected, and returns to step S11 when there is any unselected pixel.

The circuit apparatus 100 according to the embodiment described above controls the display apparatus 200 including the plurality of light source elements and the display panel 220. The circuit apparatus 100 includes the resolution reduction circuit 120 and the light source luminance determination circuit 140. The resolution reduction circuit 120 generates, from the input image data, the low-resolution image data IMC having a lower resolution than the input image data. The light source luminance determination circuit 140 receives the low-resolution image data IMC. The light source luminance determination circuit 140 determines, by the light adjustment processing based on the low-resolution image data IMC, the light source luminance information indicating luminance of light emitted by each light source element of the plurality of light source elements.

According to the embodiment, the light source luminance determination circuit 140 determines the light source luminance information using the low-resolution image data IMC having a lower resolution than the input image data. Accordingly, a load of processing of determining the light source luminance information is reduced as compared with a case where the light source luminance information is determined using the input image data. Light emission of a light source is not limited to an image as long as light emission luminance necessary for image display can be ensured. Therefore, light source luminance information necessary for image display can be determined even from the low-resolution image data IMC.

In FIG. 2, the input image data corresponds to the image data IMA. The attenuation factor distribution information is not limited to the look-up table, and may be the function information as described above.

In the embodiment, the circuit apparatus 100 includes the illumination luminance calculation circuit 150 and the color correction circuit 160. Based on the light source luminance information determined by the light source luminance determination circuit 140 and the attenuation factor distribution information indicating the attenuation factor distribution of light with respect to the distance between the light source element and the pixel, the illumination luminance calculation circuit 150 calculates the illumination luminance information indicating the luminance at which the target pixel of the display panel 220 is illuminated by the plurality of light source elements. The color correction circuit 160 performs color correction on the input image data based on the illumination luminance information.

Illumination luminance of each pixel on the display panel 220 is determined according to luminance of each light source element determined by the light source luminance determination circuit 140, and a display tone of a display image is determined by the illumination luminance and pixel data of each pixel. The color correction circuit 160 performs color correction on the input image data based on the illumination luminance information such that an image is displayed with a tone that the input image data has. That is, even when the light source luminance information is calculated from the low-resolution image data IMC, it is possible to display an image with the tone that the input image data has by image data after the color correction.

In the embodiment, the illumination luminance calculation circuit 150 calculates the illumination luminance information by the resolution of the input image data.

According to the embodiment, since the illumination luminance information is calculated by the resolution of the input image data, the color correction circuit 160 can perform, according to the illumination luminance information corresponding to each pixel, color correction on pixel data of the pixel. In this way, even when the light source luminance information is calculated from the low-resolution image data IMC, color correction can be performed for each pixel.

As described with reference to FIG. 3, the resolution reduction circuit 120 may generate the low-resolution image data IMC by performing, on the input image data, the averaging processing of a plurality of pixels, the pixel thinning processing, the reduction processing by bilinear interpolation, the reduction processing by bicubic interpolation, or the reduction processing by Lanczos interpolation.

According to the embodiment, the low-resolution image data IMC having a lower resolution than the input image data can be generated from the input image data.

As described with reference to FIG. 4, the resolution reduction circuit 120 may generate the low-resolution image data IMC by extracting, from the input image data, a maximum luminance value within a range reduced to one pixel in the low-resolution image data IMC. In the example in FIG. 4, the "range reduced to one pixel in the low-resolution image data IMC" is a range of 2×2 pixels in the image data IMA.

According to the embodiment, the low-resolution image data IMC having a lower resolution than the input image data can be generated from the input image data. In local dimming, it is necessary to set light source luminance to high luminance for a pixel having high luminance. According to the embodiment, it is possible to generate the low-resolution image data IMC while maintaining information on the high luminance pixel in the input image data. Accordingly, by obtaining the light source luminance information based on the low-resolution image data IMC, it is possible to obtain high light source luminance for a high luminance pixel in the input image data.

In the embodiment, the display apparatus 200 may be a head-up display, a meter panel, a center information display, or an electronic mirror.

A head-up display, a meter panel, a center information display, or an electronic mirror is mounted on a moving body such as an automobile. Therefore, the environment changes along with a movement of the moving body or a change in time, and various display contents are displayed along with provision of information to the user. In local dimming, light adjustment is performed according to the display contents, and according to the embodiment, a load of light adjustment processing is reduced by determining the light source luminance information based on the low-resolution image data IMC.

3. Light Source Luminance Determination Processing According to Mode

Figure 9:
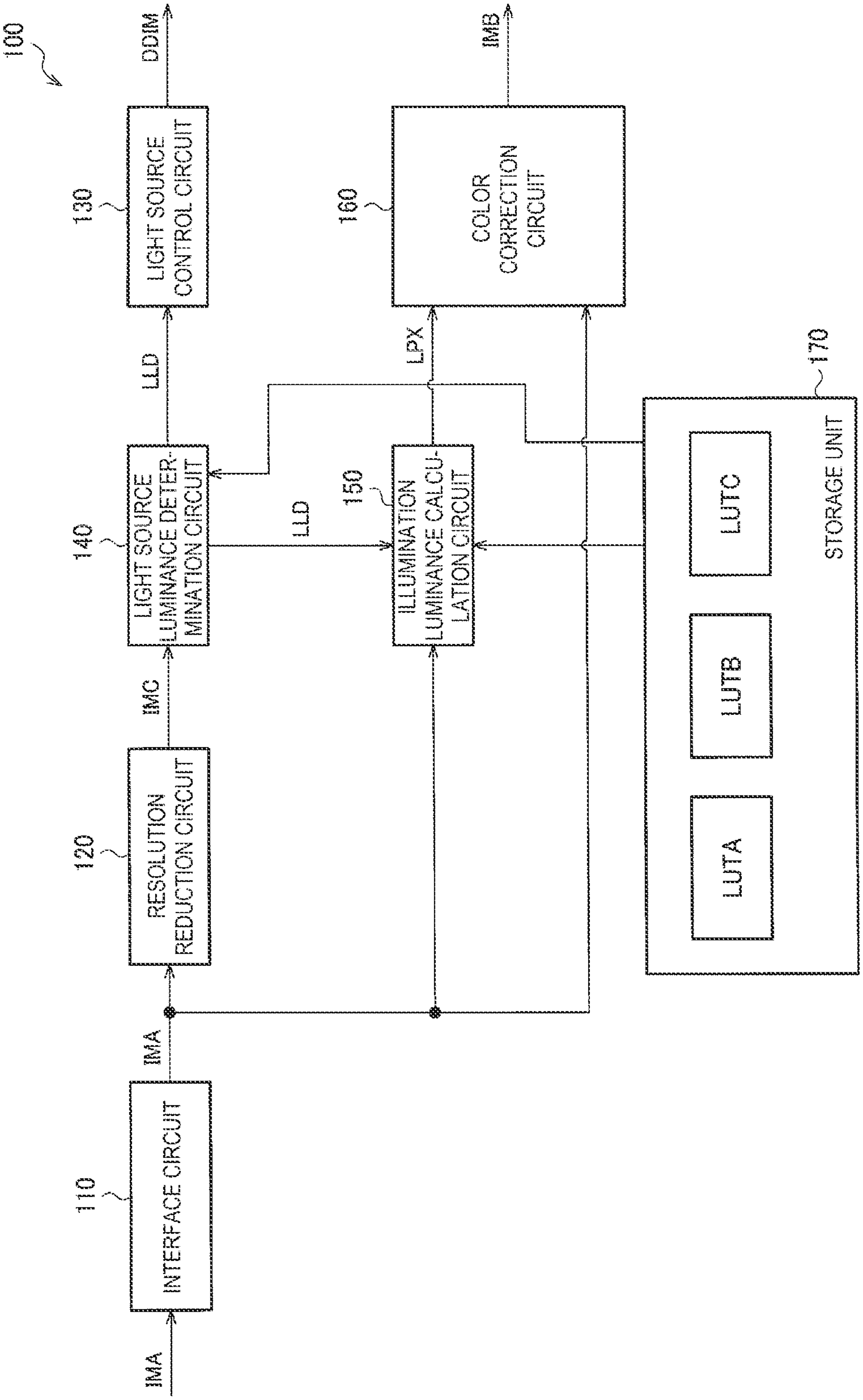
FIG. 9 is a second detailed configuration example of the circuit apparatus.

FIG. 9 is a second detailed configuration example of the circuit apparatus. The same components as those in the first detailed configuration example in FIG. 2 are denoted by the same reference numerals as those in FIG. 2, and description thereof is appropriately omitted.

The storage unit 170 stores three types of look-up tables LUTA, LUTB, and LUTC having different attenuation factor distributions. However, the number of look-up tables may be two or more.

The light source luminance determination circuit 140 reads, from the storage unit 170, a look-up table corresponding to a mode among the look-up tables LUTA, LUTB, and LUTC. For example, the processing apparatus 300 writes a mode setting into the storage unit 170, or the mode setting is written in advance in a non-volatile memory of the storage unit 170. The light luminance source determination circuit 140 reads the mode setting from the storage unit 170 and reads a look-up table corresponding to the mode setting. The light source luminance determination circuit 140 determines light source luminance information indicating light emission luminance of each light source element by performing light adjustment processing using the image data IMA and the look-up table read from the storage unit 170, and outputs the light source luminance information as the light source luminance data LLD.

Settable modes include a halo reduction mode. Halo is a phenomenon in which light bleeds into a dark portion around a bright portion in a high-contrast image. Since the light source element behind the bright portion emits light with high luminance, the light leaks from the surrounding dark portion and causes halo. The halo reduction mode is a mode in which halo reduction is emphasized in view of a balance between display luminance and halo reduction. The settable modes also include a high luminance mode. The high luminance mode is a mode in which the display luminance is emphasized in view of the balance between the display luminance and the halo reduction. The settable modes may further include a balanced mode. The balanced mode is an intermediate mode between the halo reduction mode and the high luminance mode and is a mode in which the balance between the display luminance and the halo reduction is emphasized. The look-up tables corresponding to the respective modes have different attenuation factor distributions. It is possible to freely program what attenuation factor distribution is used corresponding to each mode.

The illumination luminance calculation circuit 150 reads, from the storage unit 170, a look-up table used for calculating illumination luminance among the look-up tables LUTA, LUTB, and LUTC. For example, in the example of the look-up tables in FIGS. 10 to 12 to be described later, the illumination luminance calculation circuit 150 reads the look-up table LUTB from the storage unit 170. The look-up table used for calculating the illumination luminance may also be prepared separately from the look-up tables LUTA, LUTB, and LUTC corresponding to the modes. The illumination luminance calculation circuit 150 calculates illumination luminance information based on the light source luminance data LLD and the look-up table read from the storage unit 170, and outputs the illumination luminance information as the illumination luminance data LPX.

An example in which a plurality of discrete modes are used is described above, and alternatively, a continuously settable mode may be used. For example, the mode may be continuously settable between the halo reduction mode and the high luminance mode. The attenuation factor distribution information is, as an example, a function, and a coefficient of the function continuously changes according to the continuous mode. An example in which a plurality of discrete modes are used will be described later.

Figure 10:
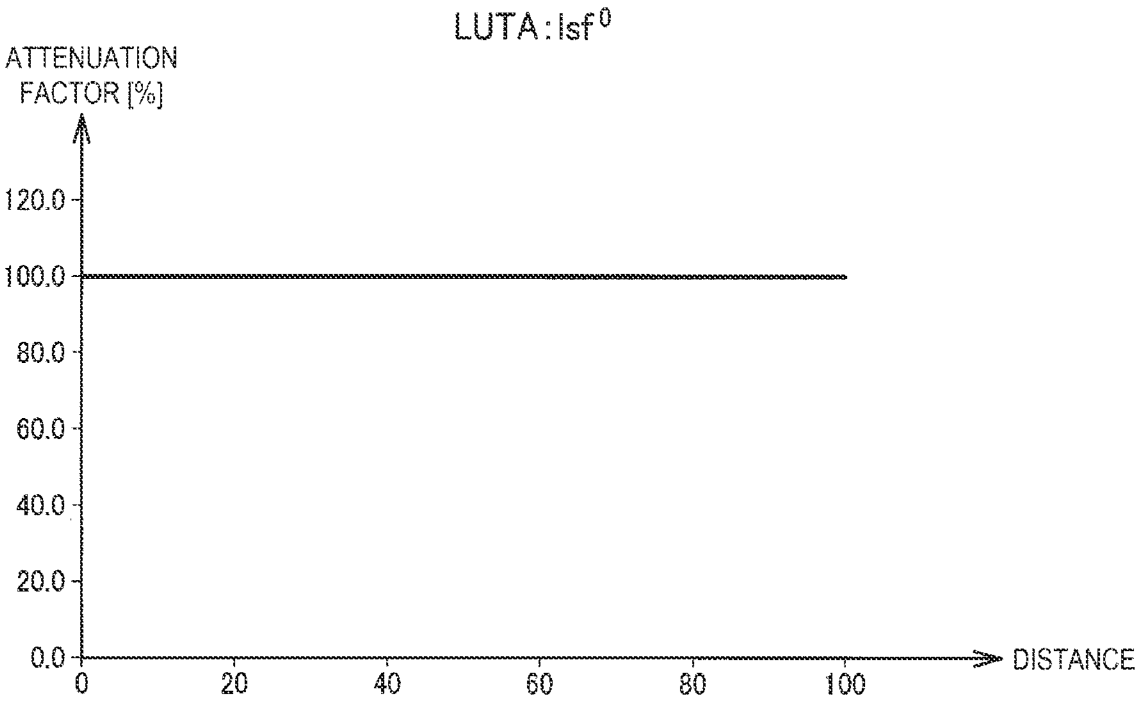
FIG. 10 is an example of an attenuation factor distribution in a look-up table LUTA.

FIG. 10 is an example of an attenuation factor distribution in the look-up table LUTA. The look-up table LUTA is a table of an attenuation factor distribution $lsf^0$. Here, an exponent on a right upper side of lsf means exponentiation of lsf. The attenuation factor distribution $lsf^0$ is a distribution having a flat characteristic in which the attenuation factor is 100% at any distance.

Figure 11:
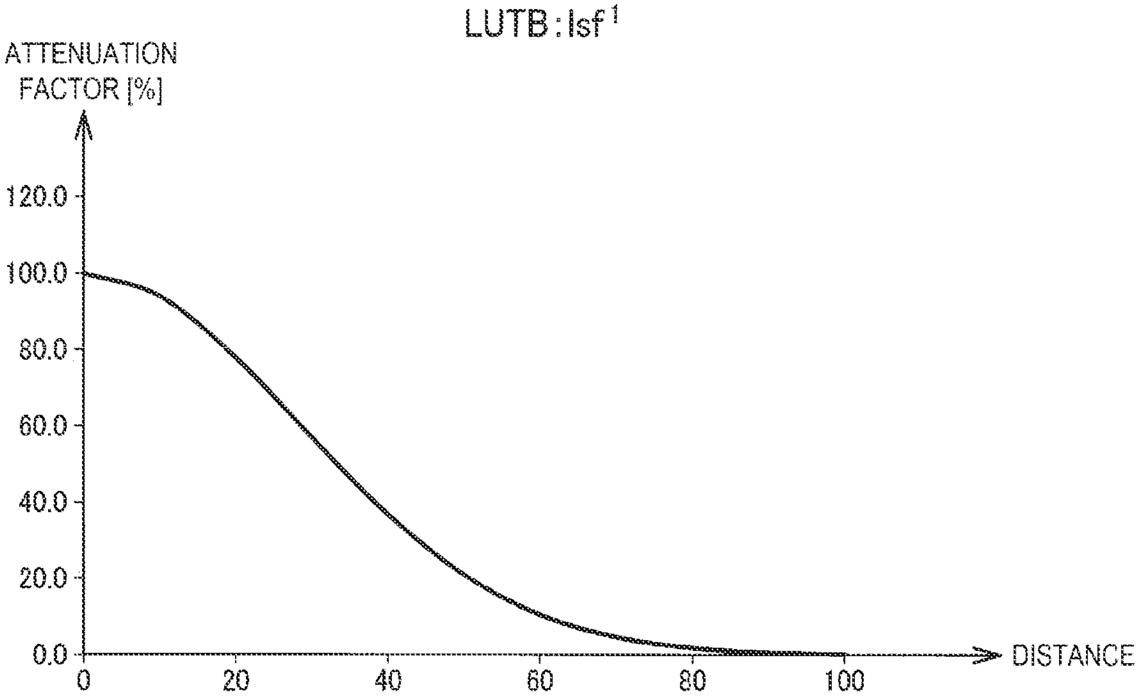
FIG. 11 is an example of an attenuation factor distribution in a look-up table LUTB.

FIG. 11 is an example of an attenuation factor distribution in the look-up table LUTB. The look-up table LUTB is a table of an attenuation factor distribution $lsf^1$. The attenuation factor distribution $lsf^1$ is, for example, an actual attenuation factor distribution or an attenuation factor distribution approximating the actual attenuation factor distribution, and alternatively, may be a virtual attenuation factor distribution programmed for calculating the light source luminance. FIG. 11 shows an attenuation factor distribution when the look-up table LUTB is the same as the look-up table LUT in FIG. 5.

Figure 12:
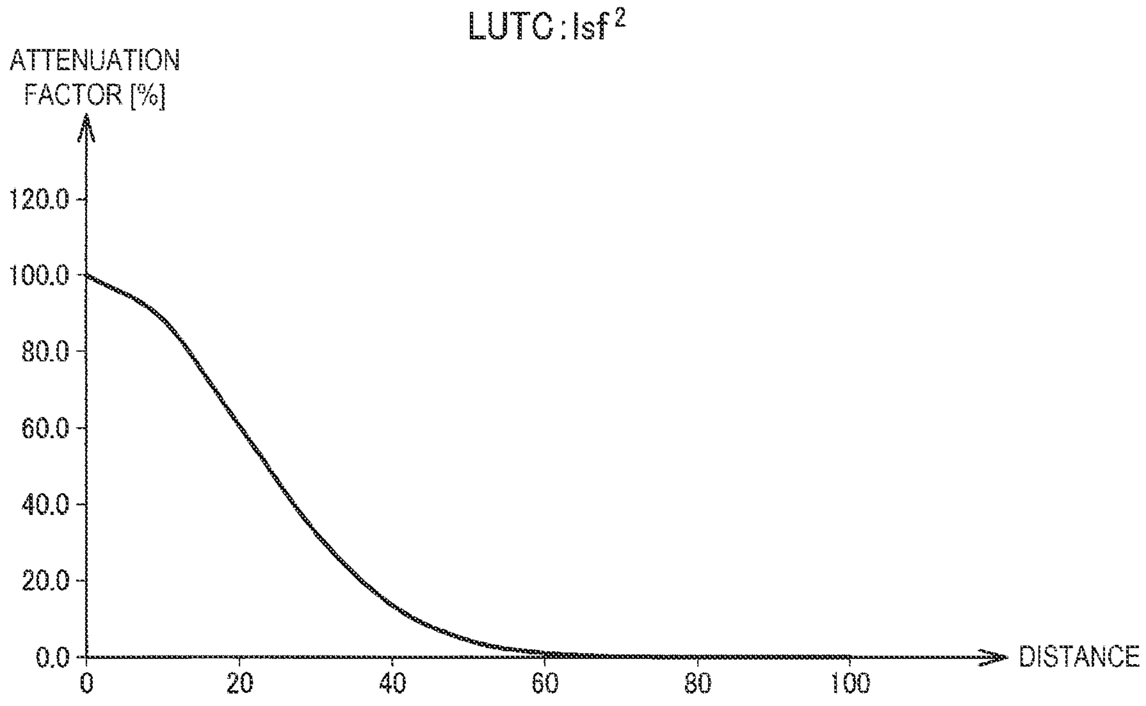
FIG. 12 is an example of an attenuation factor distribution in a look-up table LUTC.

FIG. 12 is an example of an attenuation factor distribution in the look-up table LUTC. The look-up table LUTC is a table of an attenuation factor distribution $lsf^2$. The attenuation factor distribution $lsf^2$ is, for example, a distribution obtained by squaring an actual attenuation factor distribution and is a virtual attenuation factor distribution. However, the attenuation factor distribution $lsf^2$ is not limited to the distribution obtained by squaring the actual attenuation factor distribution, and may be any programmed distribution.

The attenuation factor distribution in the look-up table LUTB has a higher degree of attenuation with respect to the distance than the attenuation factor distribution in the look-up table LUTA. The attenuation factor distribution in the look-up table LUTC has a higher degree of attenuation with respect to the distance than the attenuation factor distribution in the look-up table LUTB. An expression "the degree of attenuation with respect to the distance is high" means that a distance at which the attenuation factor decreases to a predetermined attenuation factor in the attenuation factor distribution is short. The predetermined attenuation factor may be any attenuation factor, and is, for example, an attenuation factor within a range of 50% to 0%. Alternatively, "the degree of attenuation with respect to the distance is high" means that a decrease in the attenuation factor with respect to a distance change in a direction in which the distance increases is large. Alternatively, "the degree of attenuation with respect to the distance is high" means that spread of light represented by the attenuation factor distribution is relatively narrow. FIGS. 10 to 12 show the attenuation factor distribution that smoothly changes with respect to the distance, and alternatively, the attenuation factor distribution may change stepwise with respect to the distance.

Figure 13:
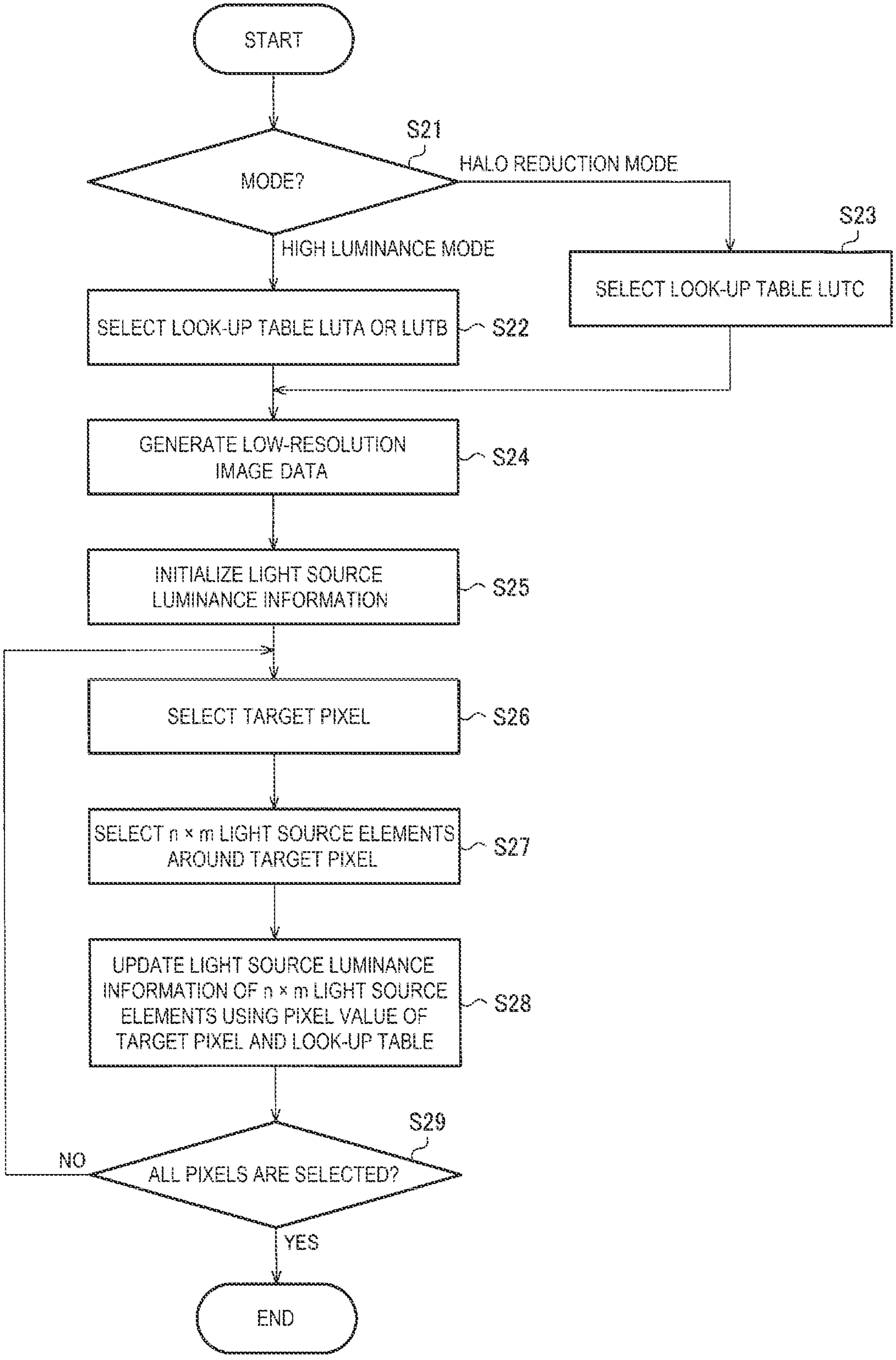
FIG. 13 is a second flow of processing performed by the resolution reduction circuit and the light source luminance determination circuit.

FIG. 13 is a second flow of processing performed by the resolution reduction circuit and the light source luminance determination circuit.

In step S21, the light source luminance determination circuit 140 checks a set mode. When the mode is the high luminance mode, the light source luminance determination circuit 140 selects the look-up table LUTA or LUTB in step S22. When the mode is the halo reduction mode, the light source luminance determination circuit 140 selects the look-up table LUTC in step S23. That is, in the halo reduction mode, the look-up table of the attenuation factor distribution having a high degree of attenuation with respect to the distance is selected. When the balanced mode is further provided, the LUTA may be selected in the high luminance mode, the LUTB may be selected in the balanced mode, and the LUTC may be selected in the halo reduction mode.

Steps S24 to S29 are the same as steps S1 to S6 in the first flow in FIG. 6. In the equation (3), x of the attenuation factor $lsf^x(k)$ is 0, 1, or 2, and is selected according to the mode. In addition, $lsf^{x+1}(k)=lsf^x(k)\times lsf(k)$ may be satisfied. The light source luminance determination circuit 140 obtains $lsf^0$ (k) by referring to the look-up table LUTA when x=0, obtains $lsf^1(k)$ by referring to the look-up table LUTB when x=1, and obtains $lsf^2(k)$ by referring to the look-up table LUTC when x=2. However, attenuation factor distribution information corresponding to x that is 3 or more may be used. Here, the attenuation factor distribution information $lsf^x(k)$ may be a virtual attenuation factor distribution. In addition, $lsf^1(k)$ may be an actual attenuation factor distribution or an attenuation factor distribution approximating the actual attenuation factor distribution, or may be a virtual attenuation factor distribution.

In the embodiment described above, the circuit apparatus 100 includes the storage unit 170. The storage unit 170 stores the attenuation factor distribution information indicating the attenuation factor distribution of light with respect to the distance between the light source element and the pixel. The light source luminance determination circuit 140 determines, by the light adjustment processing based on the low-resolution image data IMC and the attenuation factor distribution information, the light source luminance information.

Light reaching the pixel from the light source element attenuates according to the distance. By using the attenuation factor distribution information, an attenuation factor of the light reaching the pixel from the light source element can be known, and light source luminance necessary for displaying a tone of the pixel can be determined from the attenuation factor and pixel data.

In the embodiment, the storage unit 170 stores a plurality of pieces of attenuation factor distribution information. In a first mode, the light source luminance determination circuit 140 determines the light source luminance information based on the low-resolution image data IMC and first attenuation factor distribution information among the plurality of pieces of attenuation factor distribution information. In a second mode, the light source luminance determination circuit 140 determines the light source luminance information based on the low-resolution image data IMC and second attenuation factor distribution information. An attenuation factor distribution in the second attenuation factor distribution information is different from an attenuation factor distribution in the first attenuation factor distribution information.

According to the embodiment, the light source luminance information is determined based on the attenuation factor distribution according to the mode. In the embodiment, each light source element is subjected to light adjustment according to the luminance of the low-resolution image data IMC, and a light adjustment result can be changed by changing the attenuation factor distribution used for the light adjustment. That is, even when the luminance of the light source element is changed, there is no influence on a pixel where light from the light source element does not reach, and the light source element is subjected to light adjustment based on pixel data of a pixel in a range where the light from the light source element reaches. The attenuation factor distribution indicates diffusion of the light from the light source element, and by changing the attenuation factor distribution, it is possible to change how far the light is regarded as reaching from the light source element. According to the embodiment, since the light adjustment is changed by changing the attenuation factor distribution information according to the mode, it is possible to select optimal light adjustment for display contents, an environment, or the like by selecting the mode.

In the example in FIG. 9, the input image data corresponds to the image data IMA. The first mode corresponds to the high luminance mode, the first attenuation factor distribution information corresponds to the look-up table LUTA or LUTB, the second mode corresponds to the halo reduction mode, and the second attenuation factor distribution information corresponds to the look-up table LUTC. However, the first mode and the second mode may be any mode. For example, the first mode may be the balanced mode, and the second mode may be the halo reduction mode. Alternatively, the first mode may be the high luminance mode, and the second mode may be the balanced mode.

In the embodiment, the first mode is the high luminance mode, and the second mode is the halo reduction mode in which occurrence of halo is reduced as compared to the first mode.

According to the embodiment, it is possible to display the display contents with high luminance by selecting the first mode. On the other hand, by selecting the second mode, light emission luminance of the light source element can be reduced and halo can be reduced in a situation where a bright portion and a dark portion are adjacent to each other and halo is likely to occur. Accordingly, by selecting the mode in view of a trade-off between reduction of halo and reduction of luminance for illuminating the display panel, it is possible to perform optimal light adjustment for the display contents, the environment, or the like.

In the embodiment, the attenuation factor distribution in the second attenuation factor distribution information has a higher degree of attenuation of light with respect to the distance than the attenuation factor distribution in the first attenuation factor distribution information.

An attenuation factor distribution with a high degree of attenuation means that light is less likely to reach a pixel distant from the light source element than an attenuation factor distribution with a low degree of attenuation. Since the light source element is subjected to light adjustment based on pixel data of a pixel in a range where light from the light source element reaches, luminance of a light source element far from a high luminance pixel is unlikely to be increased when the attenuation factor distribution having a high degree of attenuation is used. Accordingly, in the halo reduction mode, the luminance of the light source element far from the high luminance pixel is unlikely to be increased, thus a dark portion around the high luminance pixel is unlikely to be irradiated with light, and thus halo is reduced.

Although the embodiment has been described in detail above, it can be easily understood by those skilled in the art that many modifications are possible without substantially departing from the novel matters and effects of the present disclosure. Accordingly, all such modifications are within the scope of the present disclosure. For example, a term described at least once together with a different term having a broader meaning or the same meaning in the description or the drawings can be replaced with the different term at any place in the description or the drawings. All combinations of the embodiment and the modifications are also within the scope of the present disclosure. The configurations and operations of the circuit apparatus, the backlight, the display apparatus, the display system, the processing apparatus, the electronic device, and the like are not limited to those described in the embodiment, and various modifications are possible.

What is claimed is:

1. A circuit apparatus that controls a display apparatus including a plurality of light source elements and a display panel, the circuit apparatus comprising:

a resolution reduction circuit configured to generate, from input image data, low-resolution image data having a lower resolution than the input image data;

a light source luminance determination circuit configured to receive the low-resolution image data and determine, by light adjustment processing based on the low-resolution image data, light source luminance information indicating luminance of light emitted by each light source element of the plurality of light source elements; and a storage unit configured to store attenuation factor distribution information indicating an attenuation factor distribution of light with respect to a distance between each light source element and a pixel, wherein the light source luminance determination circuit determines the light source luminance information by the light adjustment processing based on the low-resolution image data and the attenuation factor distribution information, the storage unit is further configured to store a plurality of pieces of the attenuation factor distribution information, in a first mode, the light source luminance determination circuit determines the light source luminance information based on the low-resolution image data and first attenuation factor distribution information among the plurality of pieces of the attenuation factor distribution information, and in a second mode, the light source luminance determination circuit determines the light source luminance information based on the low-resolution image data and second attenuation factor distribution information in which the attenuation factor distribution is different from that in the first attenuation factor distribution information among the plurality of pieces of the attenuation factor distribution information.

2. The circuit apparatus according to claim 1, further comprising:

an illumination luminance calculation circuit configured to calculate, based on the light source luminance information determined by the light source luminance determination circuit and the attenuation factor distribution information, illumination luminance information indicating luminance at which a target pixel of the display panel is illuminated by the plurality of light source elements; and a color correction circuit configured to perform color correction on the input image data based on the illumination luminance information.

3. The circuit apparatus according to claim 2, wherein the illumination luminance calculation circuit calculates the illumination luminance information by a resolution of the input image data.

4. The circuit apparatus according to claim 1, wherein the resolution reduction circuit generates the low-resolution image data by extracting, from the input image data, a maximum luminance value within a range reduced to one pixel in the low-resolution image data.

5. The circuit apparatus according to claim 1, wherein the resolution reduction circuit generates the low-resolution image data by performing, on the input image data, averaging processing of a plurality of pixels, pixel thinning processing, reduction processing by bilinear interpolation, reduction processing by bicubic interpolation, or reduction processing by Lanczos interpolation.

6. The circuit apparatus according to claim 1, wherein the first mode is a high luminance mode, and the second mode is a halo reduction mode in which occurrence of halo is reduced as compared to the first mode.

7. The circuit apparatus according to claim 6, wherein the attenuation factor distribution in the second attenuation factor distribution information has a higher degree of attenuation of light with respect to the distance than the attenuation factor distribution in the first attenuation factor distribution information.

8. The circuit apparatus according to claim 1, wherein the display apparatus is a head-up display, a meter panel, a center information display, or an electronic mirror.

9. A display system comprising:

the circuit apparatus according to claim 1; and the display apparatus.

* * * * *